United States Patent
Zhuge et al.

(10) Patent No.: US 12,475,525 B2
(45) Date of Patent: Nov. 18, 2025

(54) FACIAL IMAGE DEFORMATION METHOD, APPARATUS, ELECTRONIC DEVICE AND COMPUTER READABLE MEDIUM

(71) Applicant: BEIJING BYTEDANCE NETWORK TECHNOLOGY CO., LTD., Beijing (CN)

(72) Inventors: Jingjing Zhuge, Beijing (CN); Guangyao Ni, Beijing (CN); Shupeng Zhang, Beijing (CN); Xiaole Xue, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 616 days.

(21) Appl. No.: 17/776,300

(22) PCT Filed: Nov. 6, 2020

(86) PCT No.: PCT/CN2020/127274
§ 371 (c)(1),
(2) Date: May 12, 2022

(87) PCT Pub. No.: WO2021/093689
PCT Pub. Date: May 20, 2021

(65) Prior Publication Data
US 2022/0398689 A1    Dec. 15, 2022

(30) Foreign Application Priority Data
Nov. 13, 2019 (CN) .......................... 201911105629.1

(51) Int. Cl.
G06T 3/18 (2024.01)
G06F 3/04845 (2022.01)
G06V 40/16 (2022.01)

(52) U.S. Cl.
CPC ............ *G06T 3/18* (2024.01); *G06F 3/04845* (2013.01); *G06V 40/165* (2022.01)

(58) Field of Classification Search
None
See application file for complete search history.

(56) References Cited

U.S. PATENT DOCUMENTS

| | | | |
|---|---|---|---|
| 2004/0135788 A1* | 7/2004 | Davidson | G06T 15/00 345/530 |
| 2014/0104266 A1* | 4/2014 | Stone | G06F 30/00 345/419 |

(Continued)

FOREIGN PATENT DOCUMENTS

| | | |
|---|---|---|
| CN | 104077798 A | 10/2014 |
| CN | 105184735 A | 12/2015 |

(Continued)

OTHER PUBLICATIONS

International Search Report issued Jan. 27, 2021 in International Patent Application No. PCT/CN2020/127274.

(Continued)

*Primary Examiner* — Bernard Krasnic

(57) ABSTRACT

Embodiments of the present disclosure provide a facial image deformation method and apparatuses, an electronic device, and a computer-readable media. A specific embodiment of the method comprises: determining an anchor point corresponding to a dragging operation in response to detecting the dragging operation on a target facial image, wherein the anchor point corresponds to a part displayed in the target facial image; determining an offset of the anchor point based on a movement amount corresponding to the dragging operation; and deforming the target facial image based on the offset of the anchor point.

10 Claims, 6 Drawing Sheets

(56) References Cited

U.S. PATENT DOCUMENTS

| | | | | |
|---|---|---|---|---|
| 2014/0108982 A1* | 4/2014 | Pasceri | ................ | G06F 3/0486 |
| | | | | 715/769 |
| 2017/0316597 A1 | 11/2017 | Wang et al. | | |
| 2017/0316598 A1 | 11/2017 | Wang et al. | | |
| 2021/0118148 A1* | 4/2021 | Liu | .......................... | G06T 7/55 |

FOREIGN PATENT DOCUMENTS

| CN | 105956997 A | | 9/2016 |
|---|---|---|---|
| CN | 108198141 A | | 6/2018 |
| CN | 108629824 A | | 10/2018 |
| CN | 108830787 A | | 11/2018 |
| CN | 109003224 A | | 12/2018 |
| CN | 110069191 A | | 7/2019 |
| CN | 110365903 A | * | 10/2019 |
| CN | 110837332 A | | 2/2020 |

OTHER PUBLICATIONS

Written Opinion for International Application No. PCT/CN2020/127274, mailed Jan. 27, 2021, 11 Pages.

* cited by examiner

FACIAL IMAGE DEFORMATION METHOD, APPARATUS, ELECTRONIC DEVICE AND COMPUTER READABLE MEDIUM

CROSS-REFERENCE TO RELATED APPLICATIONS

This application claims the priority of Chinese Application for Invention No. 201911105629.1, filed to the Patent Office of the People's Republic of China on Nov. 13, 2019, entitled "FACIAL IMAGE DEFORMATION METHOD, APPARATUS, ELECTRONIC DEVICE AND COMPUTER READABLE MEDIUM", the entire content of which is incorporated herein by reference.

TECHNICAL FIELD

Embodiments of the present disclosure relate to the field of computer technology, and in particular, to a facial image deformation method, apparatus, electronic device, and computer readable medium.

BACKGROUND

With the continuous development of Internet technology, electronic devices represented by smartphones and various applications continue to change people's lives. Taking video applications as an example, some applications can provide various "special effects" to achieve various special shooting effects.

SUMMARY

This summary is provided for a concise introduction of the inventive concept of the present application, which will be described in detail in the Detailed Description below. This summary is not intended to identify critical features or essential features of the claimed technical solution, nor is it intended to be used to limit the scope of the claimed technical solution.

Some embodiments of the present disclosure provide a facial image deformation method and apparatuses, an electronic device, and a computer-readable media.

In a first aspect, some embodiments of the present disclosure provide a facial image deformation method, including: determining an anchor point corresponding to a dragging operation in response to detecting the dragging operation on a target facial image, wherein the anchor point corresponds to a part displayed in the target facial image; determining an offset of the anchor point based on a movement amount corresponding to the dragging operation; deforming the target facial image based on the offset of the anchor point.

In a second aspect, some embodiments of the present disclosure provide a facial image deformation apparatus, including: a first determining unit configured to determine an anchor point corresponding to a dragging operation in response to detecting the dragging operation on a target facial image, wherein the anchor point corresponds to a part displayed in the target facial image; a second determining unit configured to determine an offset of the anchor point based on a movement amount corresponding to the dragging operation; a deformation processing unit configured to deform the target facial image based on the offset of the anchor point.

In a third aspect, some embodiments of the present disclosure provide an electronic device, including: one or more processors; a memory device having stored thereon one or more programs that, when executed by the one or more processors, cause the one or more processors to implement the image deformation method described in any embodiment of the first aspect.

In a fourth aspect, some embodiments of the present disclosure provide a non-transitory computer-readable medium having stored thereon a computer program that, when executed by a processor, implements the image deformation method described in any embodiment of the first aspect.

In a fifth aspect, an embodiment of the present disclosure provides a non-transitory computer program product, including a computer program that, when executed, is used to implement the facial image deformation method provided by an embodiment of the present disclosure.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Figure 1:
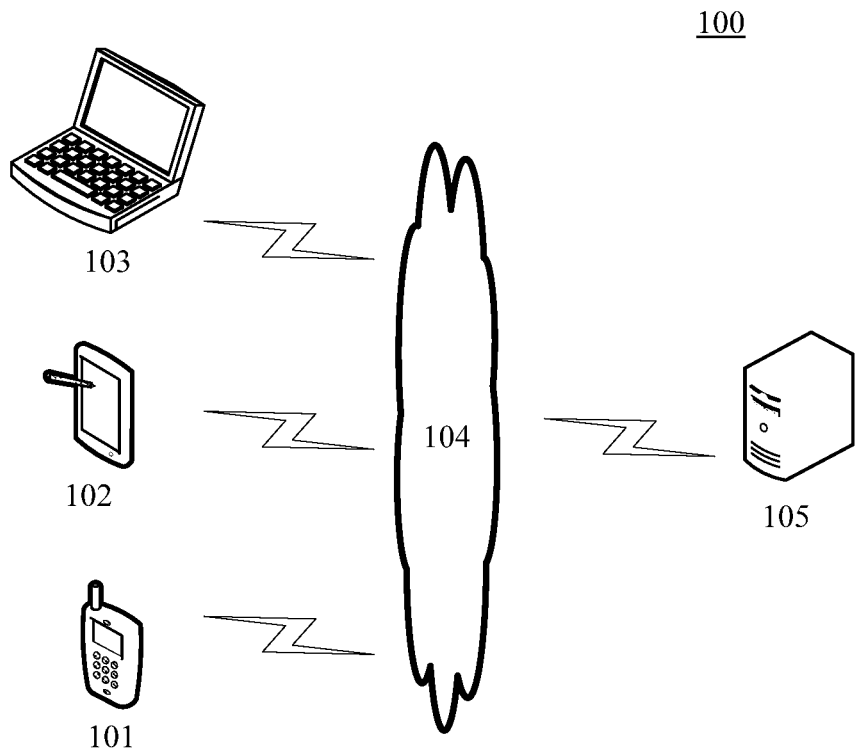
FIG. 1 is an architectural diagram of an exemplary system in which some embodiments of the present disclosure may be applied.

Exemplary embodiments of the present disclosure will now be described in detail with reference to the accompanying drawings. Although some exemplary embodiments of the present disclosure are shown in the drawings, it should be understood that the present disclosure can be implemented in various forms and should not be construed as limited to the embodiments set forth herein. Rather, these embodiments are provided for a thorough and complete understanding of the present disclosure. It should be understood that the drawings and embodiments of the present disclosure are only used for exemplary purposes, and are not used to limit the scope of protection of the present disclosure.

In addition, it should be noted that, for the convenience of description, only the parts related to the invention are shown in the drawings. In the case of no conflict, the embodiments and the features of the embodiments of the present disclosure may be combined with each other.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

Hereinafter, the present application will be described in detail with reference to the drawings and in conjunction with embodiments.

FIG. 1 illustrates an exemplary system architecture 100 to which a facial image deformation method or facial image deformation apparatus according to some embodiments of the present disclosure may be applied.

As shown in FIG. 1, the system architecture 100 may include terminal devices 101, 102, and 103, a network 104 and a server 105. The network 104 is a medium used to provide communication links between the terminal devices 101, 102, 103 and the server 105. The network 104 may include various connection types, such as wired, wireless communication links, or fiber optic cables and the like.

Users can use the terminal devices 101, 102, 103 to interact with the server 105 through the network 104 to receive or send information and the like. Various client applications may be installed on the terminal devices 101, 102 and 103, such as image or video viewing applications, image or video shooting applications, image or video processing applications, and instant messaging applications and the like.

The terminal devices 101, 102, and 103 may be hardware or software. If the terminal devices 101, 102, and 103 are hardware, they can be various electronic devices having display screens and supporting image display, including but not limited to smart phones, tablet computers, e-book readers, laptop computers and desktop computers and the like. If the terminal devices 101, 102, and 103 are software, they can be installed in the electronic devices listed above. They can be implemented, for example, as multiple software or software modules for providing distributed services, or as a single software or software module. Here, no specific limitation is imposed thereto.

The server 105 may be a server that provides various services, for example, a background server that performs processing such as storing and forwarding facial images processed by the terminal devices 101, 102, and 103.

It should be noted that, the facial image deformation method provided by the embodiment of the present disclosure is generally performed by the terminal devices 101, 102, and 103. Correspondingly, the facial image deformation apparatus is generally also provided in the terminal devices 101, 102, and 103.

It should be noted that the server may be hardware or software. If the server is hardware, it can be implemented as a distributed server cluster composed of multiple servers, or can be implemented as a single server. If the server is software, it may be implemented as multiple pieces of software or multiple software modules for providing distributed services, or may be implemented as a single piece of software or a single software module. Here, no specific limitation is imposed thereto.

It should be understood that the numbers of terminal devices, network and server in FIG. 1 are merely illustrative. There can be any number of terminal devices, networks and servers according to implementation needs, wherein the network and the server are not necessary, and may not be provided according to the actual situation.

Figure 2:
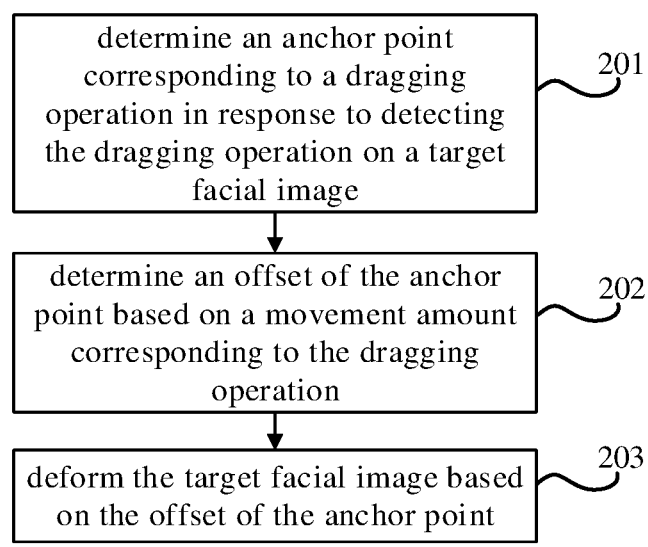
FIG. 2 is a flowchart of some embodiments of the facial image deformation method according to the present disclosure.

Referring to FIG. 2, a flowchart 200 of some embodiments of a facial image deformation method according to the present disclosure is shown. The facial image deformation method includes the following steps.

In step 201, an anchor point corresponding to a dragging operation is determined in response to detecting the dragging operation on a target facial image.

The facial image may be an image or a video frame showing a face of a person or an animal. The target facial image can be any facial image. The target facial image can be obtained by assigning, or selecting according to certain conditions. For example, a currently photographed image or video frame may be determined as the target facial image during a process of photographing a face if the execution subject has a photographing function. Of course, an assigned facial image may be determined as the target facial image.

In some embodiments, the execution subject of the facial image deformation method (e.g., the terminal device shown in FIG. 1) may first detect a dragging operation on the target facial image, wherein the dragging operation on the target image may be various types of operations. For example, it can be an on-screen operation such as a slide or click operation, or it can be an off-screen operation such as a specific voice input. The execution subject can detect the dragging operation in various ways according to different types of dragging operations. For example, for an on-screen operation, the slide event can be monitored through an interface function provided by the operating system to detect the user's dragging operation. It should be noted that the dragging operation on the target facial image may be an operation performed on the whole or part of the target facial image. For example, a dragging operation can be performed on a part (e.g., the mouth) displayed in the target facial image.

On this basis, an anchor point corresponding to the dragging operation can be determined, wherein the anchor point corresponds to a part displayed in the target facial image. According to the actual situation, the parts displayed in the target facial image may include, but are not limited to: forehead, eyes, nose, mouth, chin, cheeks, and so on. As an example, each anchor point may correspond to a part. According to the actual situation, anchor points corresponding to the various parts can be determined in different ways. As an example, an anchor point may be assigned to each part.

In practice, an anchor point corresponding to the dragging operation can be determined in various ways. Specifically, it can be assigned or can be selected based on certain conditions.

As an example, a user may be prompted to select a part displayed in the target facial image by means of a pop-up window or the like. Thus, an anchor point corresponding to the part selected by the user is used as the anchor point corresponding to the dragging operation.

As an example, an anchor point closest to a press point of the dragging operation may be determined as the anchor point corresponding to the dragging operation.

In some optional implementations, it may be further determined whether a distance between the press point of the dragging operation and the closest anchor point meets a preset condition. If the preset condition is met, the method can proceed to subsequent steps. If the preset condition is not met, the dragging operation can be abandoned and the subsequent steps are not performed. For example, this operation can be abandoned and subsequent steps will not be performed if the distance between the press point of the dragging operation and the closest anchor point is greater than a preset distance threshold.

In some optional implementations, the anchor points corresponding to the various parts displayed in the target facial image can be obtained through the following steps.

In a first step, key point detection is performed on the target facial image to obtain a set of key points. For example, a corresponding set of key points can be obtained through detecting on the target facial image using various face key point detection algorithms or models. As an example, the Haar face detection model or the LBP face detection model etc. provided by OpenCV (an open source computer vision library) can be used. As an example, Interspeices Knowledge Transfer for Facial Key Point Detection provides an algorithm for detecting facial key points of animals.

The number of key points in the set of key points can be determined according to actual needs. As an example, the number of key points may be 68, 106, and so on.

In a second step, anchor points corresponding to the parts displayed in the target facial image are determined based on the set of key points.

In practice, each key point in the set of key points often has a corresponding relationship with a different part of the face. For example, some key points in the set of key points can identify the outline of a left eye, and these key points may correspond to the left eye.

As an example, for a certain part, the execution subject may determine an anchor point corresponding to this part based on a plurality of key points corresponding to the part. For example, a weighted sum of the coordinates of multiple key points corresponding to the part can be calculated, so as to obtain the coordinates of the anchor point, that is, to determine the anchor point corresponding to the part.

According to actual needs, anchor points corresponding to parts displayed in a target facial image may be generated in advance, or may be generated when the above method is executed. Here, no specific limitation is imposed thereto.

In some optional implementations, the anchor points corresponding to the various parts displayed in the target facial image can be displayed, thereby effectively prompting the user. Thus, an invalid operation caused by an excessive distance between the press point of the user operation and the anchor point can be avoided.

In step 202, an offset of the anchor point is determined based on a movement amount corresponding to the dragging operation.

In some embodiments, the offset of the anchor point can be determined by the execution subject based on the movement amount corresponding to the dragging operation.

As an example, the movement amount corresponding to the movement operation may be obtained first. Specifically, during a dragging process, assuming that the coordinates of a current contact point are $(X_{cur}, Y_{our})$, and the coordinates of the press point are $(X_{start}, Y_{start})$, the movement amount corresponding to the dragging operation is $(X_{diff}, Y_{diff})$, wherein $X_{diff}=X_{cur}-X_{start}$, $Y_{diff}=Y_{cur}-Y_{start}$.

On the basis of obtaining the movement amount corresponding to the dragging operation, as an example, the movement amount corresponding to the dragging operation may be directly determined as the offset of the anchor point.

In some optional implementations, the execution subject may further determine the offset of the anchor point based on the movement amount corresponding to the dragging operation and pose information of a face displayed in the target facial image. Therefore, the movement amount is corrected using the pose information of the face displayed in the target facial image, resulting a more accurate deformation effect, wherein the pose information of the face displayed in the target facial image can be obtained using some face pose estimation algorithms. As examples, the face pose estimation algorithms include, but are not limited to, model-based methods, appearance-based methods, classification-based methods, and the like. The pose information can be represented by angels of pitch, yaw, and roll, which represent the angles of up-down turning, left-right turning, and in-plane rotation, respectively.

As an example, the movement amount corresponding to the dragging operation can be corrected using the following formula to obtain the offset $(X_{diff}', Y_{diff}')$ of the anchor point. Specifically, the offset of the anchor point can be calculated by the following formula:

$$X_{diff}' = \text{scale} \times \frac{X_{diff}}{\cos(yaw)} + X_{diff}^{last}$$

$$Y_{diff}' = \text{scale} \times \frac{Y_{diff}}{\cos(pitch)} + Y_{diff}^{last}$$

$$\text{scale} = a \times dist_{eye} / \cos(yaw)$$

wherein $(X_{diff}^{last}, Y_{diff}^{last})$ is an offset of the anchor point obtained by a previous operation.

$dist_{eye}$ is a distance between the eyes in the target facial image. a is a preset coefficient, and its value can be determined according to the actual situation.

In step 203, the target facial image is deformed based on the offset of the anchor point.

In some embodiments, the execution subject may deform the target facial image based on the offset of the anchor point, so as to obtain a deformed facial image. As an example, deformation processing methods include, but are not limited to: grid-based deformation, feature line-based deformation, scattered point interpolation-based deformation, and the like, wherein grid-based deformation includes embedding a grid on an image and realizing image deformation by changing the shape of the grid. Further, it also includes the subsequently developed Free-Form Deformation (FFD) and the establishment of grid layered architecture and so on. Feature line-based deformation includes, such as the method proposed by Beier and Neely et al., that determines the deformation according to positions of pixels relative to a series of line segments in an image.

As an example, in grid-based deformation, facial deformation coefficients can be obtained based on the offset of the anchor point corresponding to the dragging operation, so as to realize facial deformation. Specifically, the following steps may be included.

In a first step, for each grid point in the target facial image, based on an objective function and constraints, a transformation matrix and translation vector are obtained for the grid point, wherein the transformation matrix and the translation vector can be considered as the above facial deformation coefficients. Taking the j-th grid point as an example, the transformation matrix $M_j$ and translation vector 7) of the j-th grid point can be calculated in the following ways:

$$\underset{M_j,T_j}{\arg\min} \sum_i w_{ij} |p_i M_j + T_j - q_i|^2$$
$$\text{s.t.} M_j^T M_j = \lambda^2 I$$

In practice, the target facial image may include at least one anchor point. For the convenience of description and search, a sequence number can be added as an index for each anchor point. Here, the i-th anchor point is taken as the anchor point corresponding to the dragging operation for example. $p_i$ represents the start coordinates of the i-th anchor point; $q_i$ represents the end coordinates of the i-th anchor point after being dragged. $\lambda$ is a coefficient and its value can be determined according to the actual situation; I is a unit matrix; $w_{ij}$ represents a weight for the j-th grid point and the i-th anchor point, which can be calculated by the following formula:

$$w_{ij} = \frac{1}{|p_i - v_j|^{2\alpha}}$$

wherein $\alpha$ represents a weight attenuation coefficient, and its value can be determined according to the actual situation.

In a second step, a deformed coordinates of each grid point are obtained based on the transformation matrix and the translation vector. Taking the j-th grid point as an example, the deformed coordinates $f_s(v_j)$ of the j-th grid point can be calculated by the following formula:

$$f_s(v_j) = v_j M_j + T_j$$

wherein $v_j$ represents the original coordinates of the j-th grid point.

Figure 3:
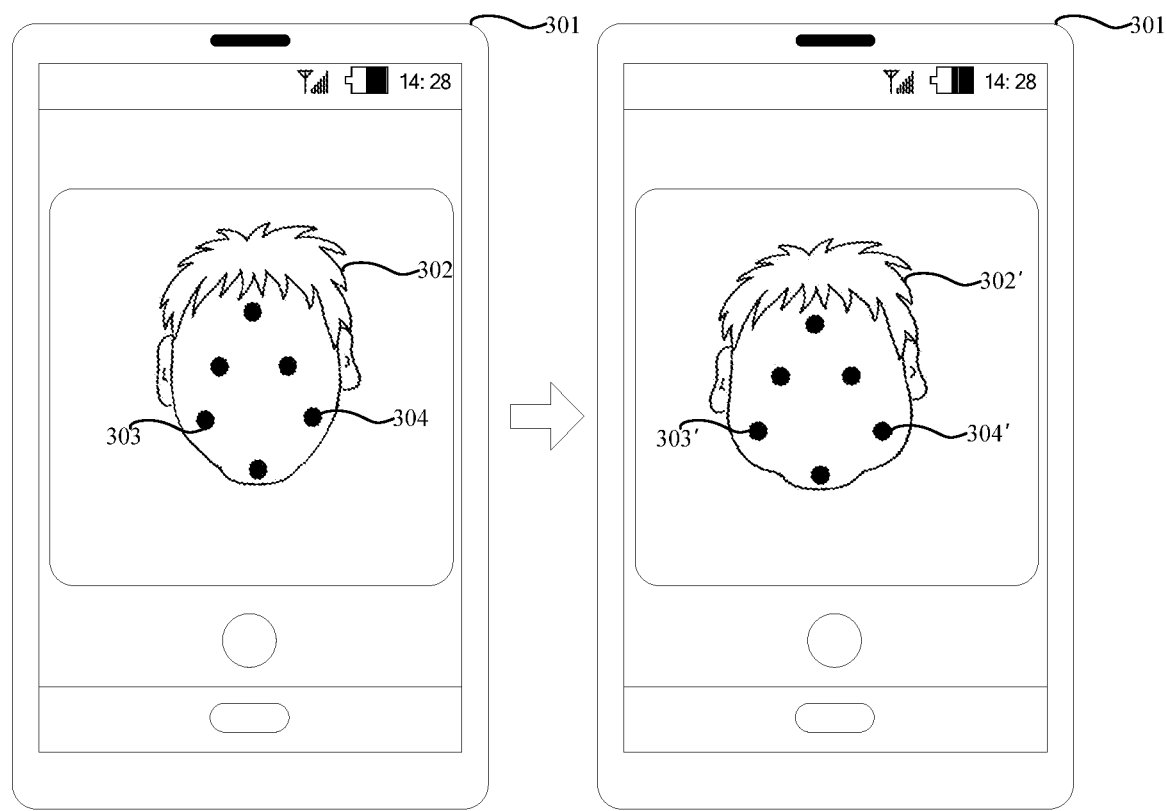
FIG. 3 is a schematic diagram of an application scenario of the facial image deformation method according to some embodiments of the present disclosure.

Referring to FIG. 3, a schematic diagram of an application scenario of the facial image deformation method according to some embodiments of the present disclosure is shown. In the application scenario of FIG. 3, a user can install application A that supports video recording on a smart phone 301. Therefore, the user can take a selfie through application A. In this process, an image currently captured by a camera is used as the target facial image, as shown in 302 in the figure. Application A can first detect key points in the target facial image 302 to obtain a corresponding set of key points. Therefore, application A can determine the position information of six anchor points based on the set of key points corresponding to the target facial image 302. In this application scenario, for the convenience of description, six positioning points are shown in the figure. It should be noted that, in practice, according to the actual situation, the anchor points may or may not be displayed. In this application scenario, the six anchor points correspond to the forehead, left eye, right eye, left cheek, right cheek, and chin, respectively. After that, rendering is performed on the screen of the smart phone 301 according to the position information of the six anchor points, so as to display the six anchor points as shown in the figure. Optionally, prompt information may be displayed on the screen to prompt the user to perform a dragging operation on the target facial image.

As an example, the user drags on the left and right cheeks displayed in the target facial image, the position of the anchor point corresponding to the left cheek before the movement is shown as 303 in the figure. The position of the anchor point corresponding to the right cheek before the movement is shown as 304. Application A may determine an anchor point corresponding to the dragging operation in response to detecting the user's dragging operation on the target facial image 302. In this scenario, anchor points corresponding to the dragging operation are the anchor points 303 and 304 as an example. On this basis, a movement amount corresponding to the dragging operation, that is, a movement amount of the user's finger on the screen, can be determined as an offset of each of the anchor points 303 and 304. The positions of the moved anchor points are shown as 303' and 304' in the figure. Further, the target facial image 302 is deformed based on the offsets of the two anchor points, so as to obtain a new facial image 302'.

It can be understood that, according to actual needs, the number of anchor points can be different according to the number of parts in the target facial image that support dragging. As an example, the number of anchor points may be: 3, 4, 5, 6 Taking the left cheek, right cheek, and chin as parts that support dragging in the target facial image as an example, the number of corresponding anchor points is three. Therefore, the user can drag at least one of the left cheek, the right cheek, and the chin to realize image deformation. In the facial image deformation method provided by some embodiments of the present disclosure, the user can drag the facial image according to a desired deformation effect, so as to achieve a more flexible and targeted deformation effect.

Figure 4:
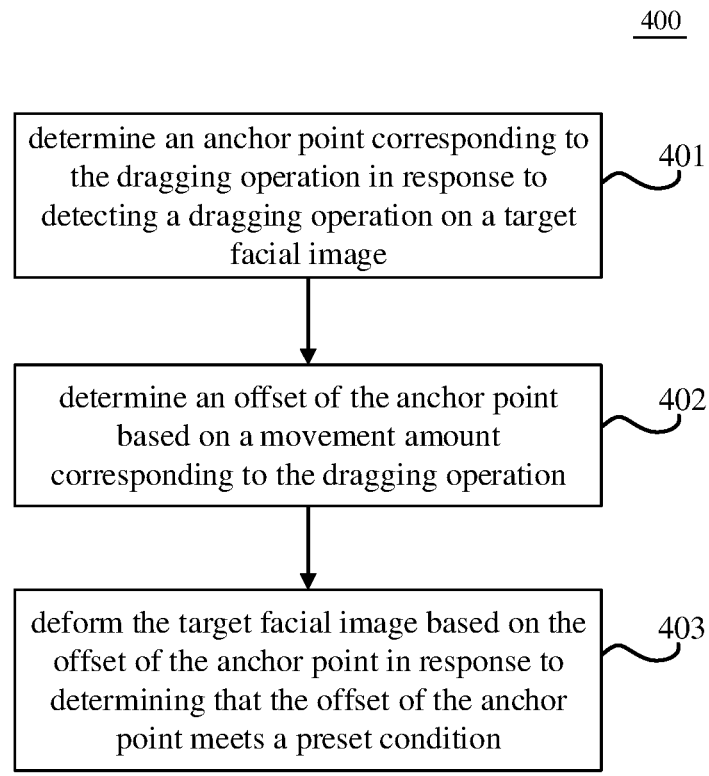
FIG. 4 is a flowchart of other embodiments of the facial image deformation method according to the present disclosure.

Referring to FIG. 4, a flowchart 400 of other embodiments of the facial image deformation method is shown. The flowchart 400 of the facial image deformation method includes the following steps.

In step 401, an anchor point corresponding to the dragging operation is determined in response to detecting a dragging operation on a target facial image.

In step 402, an offset of the anchor point is determined based on a movement amount corresponding to the dragging operation.

In some embodiments, for the specific implementation of steps 401-402 and the technical effects brought about, reference may be made to steps 201-202 in the embodiments corresponding to FIG. 2, which will not be described in detail herein.

In step 403, the target facial image is deformed based on the offset of the anchor point in response to determining that the offset of the anchor point meets a preset condition.

Figure 8:
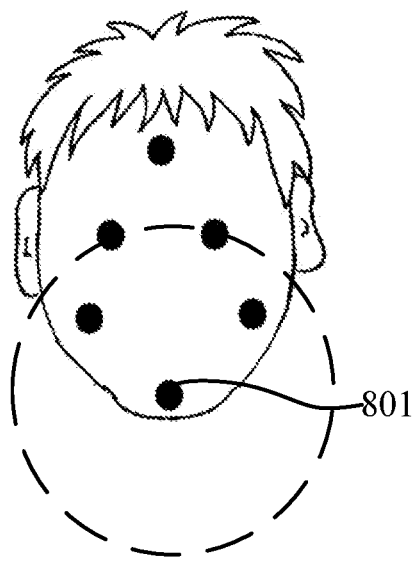
FIG. 8 is a diagram of a facial image deformation method according to the present disclosure.

In some embodiments, the execution subject of the facial image deformation method may determine whether the offset of the anchor point meets a preset condition, wherein the preset condition may be various restriction conditions for the offset. For example, the preset condition may be: an offset of the target anchor point that is less than or equal to a maximum offset corresponding to the target anchor point. Thus, the execution subject can deform the target facial image based on the offset of the anchor point in response to determining that the offset of the anchor point is less than or equal to a maximum offset corresponding to the target anchor point. The target facial image is deformed based on the maximum offset corresponding to the anchor point in response to determining that the offset of the anchor point is greater than the maximum offset. Referring to FIG. 8, which shows, as an example, the maximum offset of the anchor point 801, i.e., a boundary marked by the dotted line.

As an example, the maximum offset ($X_{diff}^{max}$, $Y_{diff}^{max}$) corresponding to the anchor point can be calculated by the following formula:

$$X_{diff}^{max} = \frac{1}{\sqrt{\frac{1}{\text{ellipse\_a}^2} + \frac{\tan\theta}{\text{ellipse\_b}^2}}}$$

$$Y_{diff}^{max} = X_{diff}^{max} \times \tan\theta$$

$$\tan\theta = \frac{Y'_{diff}}{X'_{diff}}$$

wherein ellipse_a and ellipse_b respectively represent a long axis and a short axis that define an ellipse corresponding to the anchor point, and their values can be determined according to actual needs. ($X_{diff}'$, $Y_{diff}'$) is the offset of the anchor point.

As can be seen from FIG. 4, compared with the description of some embodiments corresponding to FIG. 2, the process 400 of the facial image deformation method in some embodiments corresponding to FIG. 4 can control the deformation effect to a certain extent by setting preset conditions. For example, when the user arbitrarily drags the target facial image, situations such as facial features flipping and facial asymmetry can be avoided.

Figure 7:
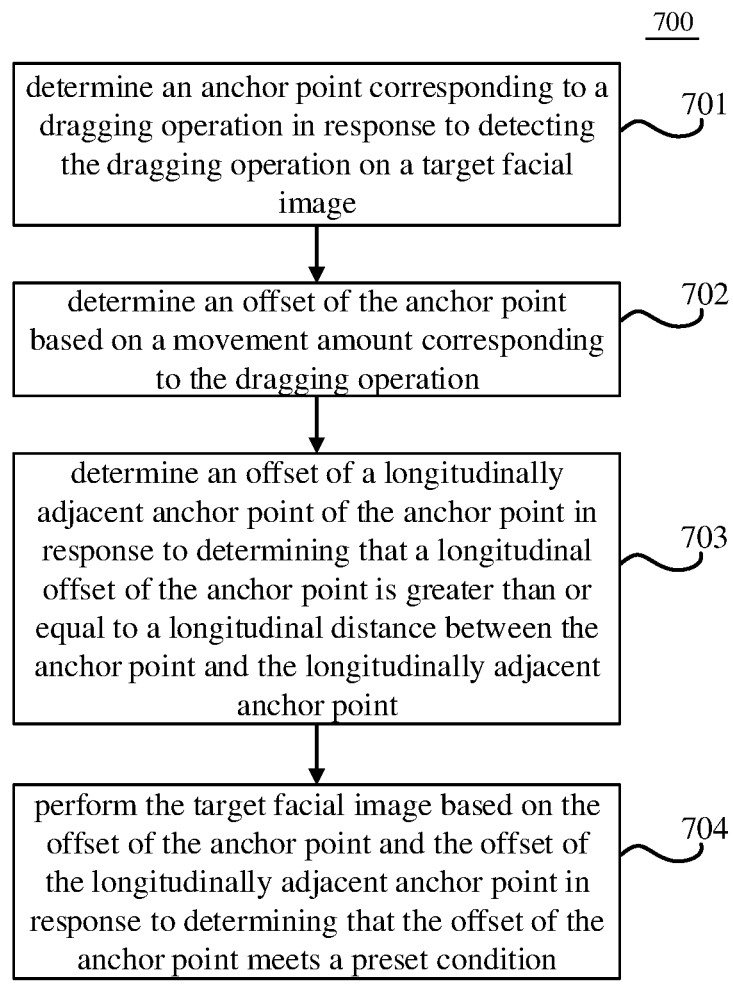
FIG. 7 is a flowchart of further embodiments of the facial image deformation method according to the present disclosure.

Referring to FIG. 7, a flowchart 700 of still other embodiments of the facial image deformation method is shown. The flowchart 700 of the facial image deformation method includes the following steps.

In step 701, an anchor point corresponding to a dragging operation is determined in response to detecting the dragging operation on a target facial image.

In step 702, an offset of the anchor point is determined based on a movement amount corresponding to the dragging operation.

In some embodiments, for the specific implementation of steps 701-702 and the technical effects brought about, reference may be made to steps 201-202 in the embodiments corresponding to FIG. 2, which will not be described in detail herein.

In step 703, an offset of a longitudinally adjacent anchor point of the anchor point is determined in response to determining that a longitudinal offset of the anchor point is greater than or equal to a longitudinal distance between the anchor point and the longitudinally adjacent anchor point.

In some embodiments, a longitudinal offset of the anchor point is a longitudinal component of the offset of the anchor point, and the longitudinal distance between the anchor point and the longitudinally adjacent anchor point may be a longitudinal component of the distance between the anchor point and the longitudinally adjacent anchor point. For example, an anchor point adjacent to an anchor point corresponding to the left eye may be an anchor point corresponding to the left cheek, or an anchor point corresponding to the forehead. The offset of the adjacent anchor point can be determined according to the actual situation. For example, the offset of the adjacent anchor point may be equal to the offset of the anchor point. For another example, the offset of the adjacent anchor point may be a product of the offset of the anchor point and a preset coefficient.

Figure 9:
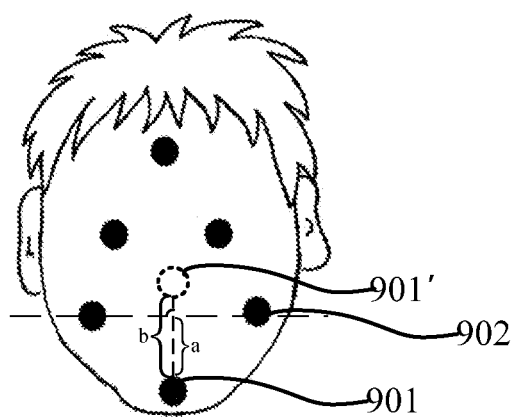
FIG. 9 is a diagram of a facial image deformation method according to the present disclosure.

Referring to FIG. 9, as an example, the anchor point 901 is shifted to 901' in the figure. The longitudinal offset of the anchor point 901 is b, and the longitudinal distance between the anchor point 901 and the longitudinally adjacent anchor point 902 is a. In response to determining that the longitudinal offset of the anchor point is greater than the longitudinal distance between the anchor point and the longitudinally adjacent anchor point, i.e., b is greater than a in the figure, an offset of the longitudinally adjacent anchor point 902 is determined. For example, the offset of longitudinally adjacent anchor points 902 may be determined as the difference between b and a.

In step 704, the target facial image is performed based on the offset of the anchor point and the offset of the longitudinally adjacent anchor point in response to determining that the offset of the anchor point meets a preset condition.

In some embodiments, the target facial image is processed based on the offset of the anchor point and the offset of the longitudinally adjacent anchor point. As an example, the target facial image may be processed first based on the offset of the anchor point to obtain a preprocessed facial image. On this basis, deformation processing is performed on the preprocessed facial image based on the offset of the longitudinally adjacent anchor point. For the specific deformation processing, reference can be made to the deformation processing in step 203 in the embodiments corresponding to FIG. 2, which will not be described in detail herein.

Compared with those embodiments corresponding to FIG. 4, in the embodiments corresponding to FIG. 7, a step of comparing the longitudinal offset of the anchor point and the longitudinal distance between the anchor point and a longitudinally adjacent anchor point is added. Therefore, a stable relative positional relationship between the parts corresponding to the anchor points can be guaranteed. For example, the forehead, eyes, cheeks and chin are arranged in order from top to bottom. This relative positional relationship will not change due to the offsets of some anchor points, thereby ensuring that the relative positional relationship between the various parts of the face in the deformed image remains unchanged.

In some optional implementations, before deforming the target facial image based on the offset of the target anchor point in response to determining that the offset of a target anchor point meets a preset condition, the method may further include: in response to determining that there is an anchor point among at least three anchor points that is displayed symmetrically to the target anchor point, determining an offset of the symmetrically displayed anchor point. There are symmetrical parts among the parts corresponding to the anchor points. For example, the left eye and the right eye are symmetrical. On this basis, as an example, it can be determined that the longitudinal offset of the symmetrically displayed anchor point is equal to the longitudinal offset of the target anchor point, while their lateral offsets are opposite in direction. On this basis, deforming the target facial image based on the offset of the target anchor point includes: deforming the target facial image based on the offset of the target anchor point and the offset of the symmetrically displayed anchor point. Thus, the symmetry of the face in the deformed image can be guaranteed.

Figure 5:
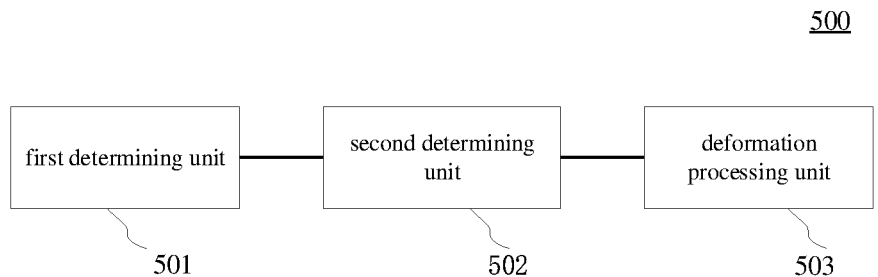
FIG. 5 is a schematic structural diagram of some embodiments of the facial image deformation apparatus according to the present disclosure.

Referring to FIG. 5, as an implementation of the method shown in the above figures, the present disclosure provides some embodiments of a facial image deformation apparatus. These apparatus embodiments correspond to those method embodiments shown in FIG. 2. Specifically, the apparatus can be applied to various electronic devices.

As shown in FIG. 5, the facial image deformation apparatus 500 in some embodiments includes: a first determining unit 501, a second determining unit 502, and a deformation processing unit 503. The first determining unit 501 is configured to determine an anchor point corresponding to a dragging operation, wherein the anchor point corresponds to a part displayed in the target facial image in response to detecting the dragging operation on a target facial image; the second determining unit 502 is configured to determine an offset of the anchor point based on a movement amount corresponding to the dragging operation; the deformation processing unit 503 is configured to deform the target facial image based on the offset of the anchor point.

In the optional implementations of some embodiments, the anchor point corresponding to the part displayed in the target facial image is obtained through the following steps: performing key point detection on the target facial image to obtain a set of key points; and determining the anchor point corresponding to the part displayed in the target facial image based on the set of key points.

In the optional implementations of some embodiments, the second determining unit 502 can be further configured to: determine an offset of the anchor point based on a movement amount corresponding to the dragging operation and pose information of a face displayed in the target facial image, wherein the pose information is used to represent rotation angle of the face.

In the optional implementations of some embodiments, the deformation processing unit 503 can be further configured to: deform the target facial image based on the offset of the anchor point in response to determine that the offset of the anchor point meets a preset condition.

In the optional implementations of some embodiments, the apparatus 500 may further include a third determining unit (not shown in the figure), wherein the third determining unit is configured to determine an offset of a longitudinally adjacent anchor point of the anchor point in response to determining that a longitudinal offset of the anchor point is greater than or equal to a longitudinal distance between the anchor point and the longitudinally adjacent anchor point. The deformation processing unit 503 can be further configured to: deform the target facial image based on the offset of the anchor point and the offset of the longitudinally adjacent anchor point, wherein the longitudinal offset of the anchor point is a longitudinal component of the offset of the anchor point.

In the optional implementations of some embodiments, the apparatus 500 may further include: a fourth determining unit (not shown in the figure), wherein the fourth determining unit is configured to determine an offset of an anchor point that is displayed symmetrically to the anchor point. The deformation processing unit 503 can be further configured to deform the target facial image based on the offset of the target anchor point and the offset of the symmetrically displayed anchor point.

In the optional implementations of some embodiments, the deformation processing unit 503 can be further configured to: deform the target facial image based on the offset of the anchor point in response to determining that the offset of the anchor point is less than or equal to a maximum offset corresponding to the anchor point; deform the target facial image based on the maximum offset corresponding to the anchor point in response to determining that the offset of the anchor point is greater than the maximum offset.

In some embodiments, the user can move an anchor point as needed, thereby achieving a more flexible and targeted deformation effect.

Figure 6:
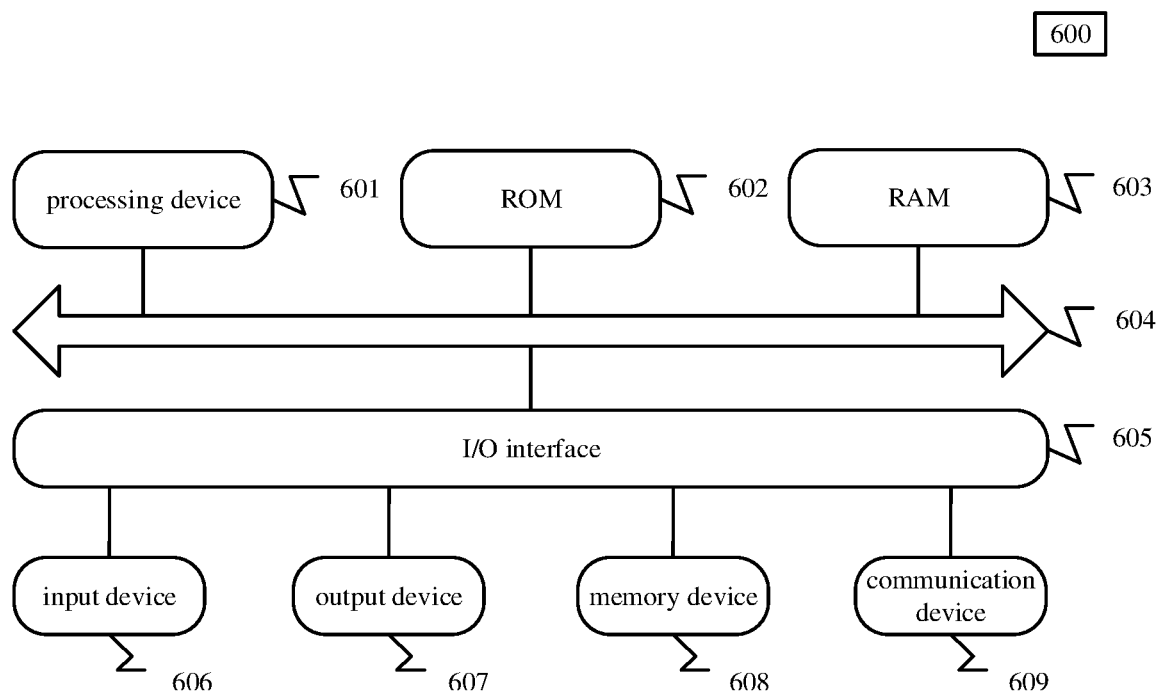
FIG. 6 is a schematic structural diagram of the electronic device suitable for implementing some embodiments of the present disclosure.

Referring now to FIG. 6, a structural diagram of an electronic device (e.g., a terminal device shown in FIG. 1) 600 suitable for implementing some embodiments of the present disclosure is shown. The terminal device of the embodiments of the present disclosure may include, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 6 is merely an example and should not impose any limitation on the function and scope of the embodiments of the present disclosure.

As shown in FIG. 6, the electronic device 600 may include a processing device (e.g., a central processing unit, a graphics processor) 601, which may perform various appropriate actions and processes according to a program stored in Read Only Memory (ROM) 602 or a program loaded from storage device 608 into Random Access Memory (RAM) 603. In RAM 603, various programs and data required for the operation of the electronic device 600 are also stored. Processing device 601, ROM 602 and RAM 603 are connected to each other through bus 604. Input/Output (I/O) interface 605 is also connected to bus 604.

Generally, the following devices can be connected to I/O interface 605: input devices 606 including, for example, a touch screen, a touch pad, a keyboard, a mouse, a camera, a microphone, an accelerometer, a gyroscope, etc; output devices 607 including a liquid crystal display (LCD), a speaker, a vibrator, etc.; memory devices 608 including, for example, a memory card; and a communication device 609. The communication device 609 enables the electronic device 600 to communicate wirelessly or wirelessly with other devices to exchange data. Although FIG. 6 shows the electronic device 600 with various components, it should be understood that it is not required to implement or have all of these components. Alternatively, more or fewer components can be implemented or provided. Each block shown in FIG. 6 may represent one device, or may represent multiple devices as required.

In particular, according to some embodiments of the present disclosure, the processes described above with reference to the flowcharts may be implemented as computer software programs. For example, some embodiments of the present disclosure include a computer program product comprising a computer program carried on a computer-readable medium, the computer program containing program code for performing the method illustrated in the flowcharts. In such embodiments, the computer program may be downloaded and installed from the network through the communication device 609, or installed from the memory device 608, or from the ROM 602. When the computer program is executed by the processing device 601, the above functions defined in the method of some embodiments of the present disclosure are performed.

It should be noted that the computer-readable medium described in some embodiments of the present disclosure may be a computer-readable signal medium or a computer-readable storage medium, or any combination thereof. The computer readable storage medium can be, for example, but not limited to, an electronic, magnetic, optical, electromagnetic, infrared, or semiconductor system, apparatus, or device, or any combination of the above. More specific examples of the computer readable storage medium may include, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In some embodiments of the present disclosure, a computer readable storage medium can be any tangible medium that can contain or store a program, which can be used by or in connection with an instruction execution system, apparatus or device. In some embodiments of the present disclosure, a computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, including but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks include a local area network ("LAN") and a wide area network ("WAN"), the Internet, and end-to-end networks (for example, ad hoc end-to-end networks), as well as any currently known or future developed networks.

The above computer-readable medium may be included in the electronic device described above; or it may exist alone without being assembled into the electronic device. The computer-readable medium carries one or more programs that cause, when executed by the electronic device, the electronic device to determine the position information of at least three anchor points based on a set of key points corresponding to a target facial image; display the at least three anchor points based on the position information; determine an offset of a target anchor point of the at least three anchor points based on a movement amount in response to detecting a movement operation of a user with respect to the target anchor point; deform the target facial image based on the offset of the target anchor point.

The computer program code for executing operations of some embodiments of the present disclose may be complied by any combination of one or more program design languages, the program design languages including object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example, through an Internet connection provided by an Internet service provider).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Units described in some embodiments of the present disclosure may be implemented in software or in hardware. The described units can also be provided in a processor, which for example can be described as: a processor comprising a first determining unit, a second determining unit, and a deformation processing unit, wherein the name of a unit does not constitute a limitation of the unit itself under certain circumstances, for example, the first determining unit may also be described as "a unit for determining an anchor point corresponding to a dragging operation".

The functions described above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

According to one or more embodiments of the present disclosure, a facial image deformation method is provided, including: determining an anchor point corresponding to a dragging operation in response to detecting the dragging operation on a target facial image, wherein the anchor point corresponds to a part displayed in the target facial image; determining an offset of the anchor point based on a movement amount corresponding to the dragging operation; and deforming the target facial image based on the offset of the anchor point.

According to one or more embodiments of the present disclosure, the anchor point corresponding to the part displayed in the target facial image is obtained through the following steps: performing key point detection on the target facial image to obtain a set of key points; and determining the anchor point corresponding to the part displayed in the target facial image based on the set of key points.

According to one or more embodiments of the present disclosure, determining an offset of the anchor point based on a movement amount corresponding to the dragging operation includes: determining an offset of the anchor point based on the movement amount corresponding to the dragging operation and pose information of a face displayed in the target facial image, wherein the pose information is used to represent rotation angle of the face.

According to one or more embodiments of the present disclosure, the deforming the target facial image based on the offset of the anchor point comprises: deforming the target facial image based on the offset of the anchor point in response to determining that the offset of the anchor point meets a preset condition.

According to one or more embodiments of the present disclosure, the method further includes: before deforming the target facial image based on the offset of the anchor point in response to determining that the offset of the anchor point meets a preset condition, determining an offset of a longitudinally adjacent anchor point of the anchor point in response to determining that a longitudinal offset of the anchor point is greater than or equal to a longitudinal distance between the anchor point and the longitudinally adjacent anchor point; wherein the deforming the target facial image based on the offset of the anchor point includes: deforming the target facial image based on the offset of the anchor point and the offset of the longitudinally adjacent anchor point, wherein the longitudinal offset of the anchor point is a longitudinal component of the offset of the anchor point.

According to one or more embodiments of the present disclosure, the method further includes: before deforming the target facial image based on the offset of the anchor point in response to determining that the offset of the anchor point meets a preset condition, determining an offset of an anchor point that is displayed symmetrically to the anchor point; wherein the deforming the target facial image based on the offset of the anchor point includes: deforming the target facial image based on the offset of the target anchor point and the offset of the symmetrically displayed anchor point.

According to one or more embodiments of the present disclosure, the deforming the target facial image based on the offset of the anchor point in response to determining that the offset of the anchor point meets a preset condition includes: deforming the target facial image based on the offset of the anchor point in response to determining that the offset of the anchor point is less than or equal to a maximum offset corresponding to the anchor point; deforming the target facial image based on the maximum offset corresponding to the anchor point in response to determining that the offset of the anchor point is greater than the maximum offset.

According to one or more embodiments of the present disclosure, a facial image deformation apparatus is provided, including: a first determining unit configured to determine an anchor point corresponding to a dragging operation in response to detecting the dragging operation on a target facial image, wherein the anchor point corresponds to a part displayed in the target facial image; a second determining unit configured to determine an offset of the anchor point based on a movement amount corresponding to the dragging operation; and a deformation processing unit configured to deform the target facial image based on the offset of the anchor point.

According to one or more embodiments of the present disclosure, the anchor point corresponding to the part displayed in the target facial image is obtained through the following steps: performing key point detection on the target facial image to obtain a set of key points; and determining the anchor point corresponding to the part displayed in the target facial image based on the set of key points.

According to one or more embodiments of the present disclosure, the second determining unit may be further configured to: determine an offset of the anchor point based on a movement amount corresponding to the dragging operation and pose information of a face displayed in the target facial image, wherein the pose information is used to represent rotation angle of the face.

According to one or more embodiments of the present disclosure, the deformation processing unit may be further configured to: deform the target facial image based on the offset of the anchor point in response to determine that the offset of the anchor point meets a preset condition.

According to one or more embodiments of the present disclosure, the apparatus may further include a third determining unit (not shown in the figure), wherein the third determining unit is configured to determine an offset of a longitudinally adjacent anchor point of the anchor point in response to determining that a longitudinal offset of the anchor point is greater than or equal to a longitudinal distance between the anchor point and the longitudinally adjacent anchor point. The deformation processing unit 503 can be further configured for: deform the target facial image based on the offset of the anchor point and the offset of the longitudinally adjacent anchor point, wherein the longitudinal offset of the anchor point is a longitudinal component of the offset of the anchor point.

According to one or more embodiments of the present disclosure, the apparatus may further include: a fourth determining unit (not shown in the figure), wherein the fourth determining unit is configured to determine an offset of an anchor point that is displayed symmetrically to the anchor point. The deformation processing unit 503 can be further configured to deform the target facial image based on the offset of the target anchor point and the offset of the symmetrically displayed anchor point.

According to one or more embodiments of the present disclosure, the deformation processing unit may be further configured to deform the target facial image based on the offset of the anchor point in response to determining that the offset of the anchor point is less than or equal to a maximum offset corresponding to the anchor point; deform the target facial image based on the maximum offset corresponding to the anchor point in response to determining that the offset of the anchor point is greater than the maximum offset.

According to one or more embodiments of the present disclosure, an electronic device is provided, including: one or more processors; a memory device having stored thereon one or more programs that, when executed by the one or more processors, cause the one or more processors to implement the method described in any of the above embodiments.

According to one or more embodiments of the present disclosure, there is provided a non-transitory computer-readable medium having stored thereon a computer program that, when executed by a processor, implements the method described in any of the above embodiments.

According to one or more embodiments of the present disclosure, there is provided a non-transitory computer program product comprising a computer program, which when executed implements the facial image deformation method described in any of the above embodiments.

The above description only shows preferred embodiments of the present disclosure and illustrates technical principles applied in the present application. Those skilled in the art should understand that the scope of the embodiments of the present disclosure is not limited to the technical solution formed by a specific combination of the above technical features, and should encompass other technical solutions formed by any combinations of the above technical features or their equivalent features without departing from the above inventive concept, such as, a technical solution formed by replacing the above features with technical features with functions similar to those features (but not limited to these features) disclosed in the embodiments of the present disclosure.

What is claimed is:

1. A facial image deformation method, comprising:
determining an anchor point corresponding to a dragging operation in response to detecting the dragging operation on a target facial image, wherein the anchor point corresponds to a part displayed in the target facial image;

determining an offset of the anchor point based on a movement amount corresponding to the dragging operation;

deforming the target facial image based on the offset of the anchor point, wherein the deforming the target facial image based on the offset of the anchor point comprises:

deforming the target facial image based on the offset of the anchor point in response to determining that the offset of the anchor point meets a preset condition; and before deforming the target facial image based on the offset of the anchor point in response to determining that the offset of the anchor point meets a preset condition, determining an offset of a longitudinally adjacent anchor point of the anchor point in response to determining that a longitudinal offset of the anchor point is greater than or equal to a longitudinal distance between the anchor point and the longitudinally adjacent anchor point;

wherein the deforming the target facial image based on the offset of the anchor point comprises:

deforming the target facial image based on the offset of the anchor point and the offset of the longitudinally adjacent anchor point, wherein the longitudinal offset of the anchor point is a longitudinal component of the offset of the anchor point, and a longitudinal distance between the anchor point and the longitudinally adjacent anchor point is a longitudinal component of a distance between the anchor point and the longitudinally adjacent anchor point.

2. The facial image deformation method according to claim 1, wherein the anchor point corresponding to the part displayed in the target facial image is obtained through the following steps:

performing key point detection on the target facial image to obtain a set of key points; and determining the anchor point corresponding to the part displayed in the target facial image based on the set of key points.

3. The facial image deformation method according to claim 2, wherein the determining the anchor point corresponding to the part displayed in the target facial image based on the set of key points comprises:

calculating a weighted sum of coordinates of multiple key points in the set of key points corresponding to the part, so as to determine coordinates of the anchor point corresponding to the part displayed in the target facial image.

4. The facial image deformation method according to claim 1, wherein the determining an offset of the anchor point based on a movement amount corresponding to the dragging operation comprises:

determining an offset of the anchor point based on a movement amount corresponding to the dragging operation and pose information of a face displayed in the target facial image, wherein the pose information is used to represent rotation angle of the face.

5. An electronic device, comprising:

one or more processors; and a memory device having stored thereon one or more programs, which when executed by the one or more processors cause the one or more processors to implement the facial image deformation method according to claim 1.

6. A non-transitory computer program product, comprising a computer program, which when executed implements the facial image deformation method according to claim 1.

7. A facial image deformation apparatus, comprising:

a first determining unit configured to determine an anchor point corresponding to a dragging operation in response to detecting the dragging operation on a target facial image, wherein the anchor point corresponds to a part displayed in the target facial image;

a second determining unit configured to determine an offset of the anchor point based on a movement amount corresponding to the dragging operation;

a deformation processing unit configured to deform the target facial image based on the offset of the anchor point, wherein the deformation processing unit is configured to deform the target facial image based on the offset of the anchor point in response to determining that the offset of the anchor point meets a preset condition; and a third determining unit configured to, before the deformation processing unit deforms the target facial image based on the offset of the anchor point in response to determining that the offset of the anchor point meets a preset condition, determine an offset of a longitudinally adjacent anchor point of the anchor point in response to determining that a longitudinal offset of the anchor point is greater than or equal to a longitudinal distance between the anchor point and the longitudinally adjacent anchor point, wherein the deformation processing unit is configured to deform the target facial image based on the offset of the anchor point and the offset of the longitudinally adjacent anchor point, wherein the longitudinal offset of the anchor point is a longitudinal component of the offset of the anchor point, and a longitudinal distance between the anchor point and the longitudinally adjacent anchor point is a longitudinal component of a distance between the anchor point and the longitudinally adjacent anchor point.

8. A non-transitory computer-readable storage medium having stored thereon instructions which, when executed by a processor, cause the processor to:

determining an anchor point corresponding to a dragging operation in response to detecting the dragging operation on a target facial image, wherein the anchor point corresponds to a part displayed in the target facial image;

determining an offset of the anchor point based on a movement amount corresponding to the dragging operation;

deforming the target facial image based on the offset of the anchor point, wherein the deforming the target facial image based on the offset of the anchor point comprises:

deforming the target facial image based on the offset of the anchor point in response to determining that the offset of the anchor point meets a preset condition; and before deforming the target facial image based on the offset of the anchor point in response to determining that the offset of the anchor point meets a preset condition, determining an offset of a longitudinally adjacent anchor point of the anchor point in response to determining that a longitudinal offset of the anchor point is greater than or equal to a longitudinal distance between the anchor point and the longitudinally adjacent anchor point, wherein the deforming the target facial image based on the offset of the anchor point comprises:

deforming the target facial image based on the offset of the anchor point and the offset of the longitudinally adjacent anchor point, wherein the longitudinal offset of the anchor point is a longitudinal component of the offset of the anchor point, and a longitudinal distance between the anchor point and the longitudinally adjacent anchor point is a longitudinal component of a distance between the anchor point and the longitudinally adjacent anchor point.

9. The non-transitory computer-readable storage medium according to claim 8, wherein the non-transitory computer-readable storage medium further stores program instructions which, when executed by the processor, cause the processor to:

performing key point detection on the target facial image to obtain a set of key points; and determining the anchor point corresponding to the part displayed in the target facial image based on the set of key points.

10. The non-transitory computer-readable storage medium according to claim 8, wherein the determining an offset of the anchor point based on a movement amount corresponding to the dragging operation comprises:

determining an offset of the anchor point based on a movement amount corresponding to the dragging operation and pose information of a face displayed in the target facial image, wherein the pose information is used to represent rotation angle of the face.

* * * * *